(12) United States Patent
McCausland

(10) Patent No.: US 7,517,376 B2
(45) Date of Patent: Apr. 14, 2009

(54) REVERSE PULSE CLEANING OF FILTER ELEMENTS

(75) Inventor: Andrew John McCausland, Milperra (AU)

(73) Assignee: Goyen Controls Co. Pty. Ltd., Milperra, NSW (AU)

( * ) Notice: Subject to any disclaimer, the term of this patent is extended or adjusted under 35 U.S.C. 154(b) by 552 days.

(21) Appl. No.: 10/499,732

(22) PCT Filed: Dec. 18, 2002

(86) PCT No.: PCT/AU02/01716

§ 371 (c)(1),
(2), (4) Date: May 12, 2005

(87) PCT Pub. No.: WO03/053539

PCT Pub. Date: Jul. 3, 2003

(65) Prior Publication Data

US 2005/0210842 A1    Sep. 29, 2005

(30) Foreign Application Priority Data

Dec. 20, 2001   (AU) .......................................... 9668

(51) Int. Cl.
*F16K 31/122* (2006.01)
(52) U.S. Cl. .............................. 55/302; 55/294; 55/283; 95/278; 95/279; 95/280; 210/333.01; 210/411; 210/791; 210/797; 210/798; 251/30.05; 251/44; 251/61.1
(58) Field of Classification Search ............... 55/302, 55/294, 283; 95/278, 279, 280; 210/333.01, 210/411, 791, 797, 798; 251/30.05, 44, 61.1
See application file for complete search history.

(56) References Cited

U.S. PATENT DOCUMENTS 4,046,526 A    9/1977   Phillipi et al.

(Continued)

FOREIGN PATENT DOCUMENTS

AU          9105382        6/1983

(Continued)

*Primary Examiner*—Duane S Smith
*Assistant Examiner*—Minh-Chau T Pham
(74) *Attorney, Agent, or Firm*—Daniel N. Daisak

(57) ABSTRACT

An air supply system and valve is disclosed which provides a reverse pulse of air for cleaning a filter element located in a filter house. A valve is also disclosed for use in the air supply system. The system includes a pressure vessel adapted to contain a volume of compressed air to be used for supplying the reverse pulse, the pressure vessel having a wall with at least one outlet aperture therein. The valve is mounted to the wall around the aperture to control the flow of air from the pressure vessel, the valve means comprising a valve body having an inlet, an outlet and a flow passage connecting the inlet and outlet, the inlet, the outlet and the flow passage generally extending axially through the valve body, a valve seat surrounding the flow passage, and a valve closure member movable towards and away from the valve seat into closed and open positions to thereby close or open the flow passage, and operating means for moving the valve closure member between the closed and open positions. A conduit mounted to the valve body around the outlet and adapted to extend into the filter house in use so as to direct a pulse of air towards a filter element to be cleaned when the valve closure member is in the open position.

36 Claims, 11 Drawing Sheets

U.S. PATENT DOCUMENTS

| | | |
|---|---|---|
| 4,360,370 A | 11/1982 | McAndrew |
| 4,655,799 A | 4/1987 | Bosworth et al. |
| 5,002,594 A * | 3/1991 | Merritt .................. 55/302 |
| 5,178,652 A * | 1/1993 | Huttlin .................. 95/279 |
| 5,533,706 A * | 7/1996 | Aurell .................. 251/44 |
| 5,837,017 A | 11/1998 | Santschi et al. |
| 5,927,329 A | 7/1999 | Yie |
| 6,073,905 A | 6/2000 | Wilson |
| 7,195,659 B2 * | 3/2007 | Sporre et al. .................. 55/302 |

FOREIGN PATENT DOCUMENTS

| | | |
|---|---|---|
| EP | 0225613 | 6/1987 |
| EP | 0 922 479 | 6/1999 |
| EP | 0947901 A2 | 6/1999 |
| GB | 1290786 | 9/1972 |
| GB | 2 326 214 A | 12/1998 |
| JP | 2002-102632 | 4/2002 |

\* cited by examiner

REVERSE PULSE CLEANING OF FILTER ELEMENTS

FIELD OF THE INVENTION

This invention relates to a valve that can be used to control reverse pulse cleaning of filter elements and to a reverse pulse cleaning system that incorporates such a valve.

BACKGROUND OF THE INVENTION

Reverse pulse cleaning systems are traditionally used to clean bag type filter elements located in bag houses or the like. In one application, filter bags are suspended from a support plate and are held in an open position by a wire cage or the like. Air to be cleaned is passed up through the filter bags from below the plate through the filter bags and through apertures in the plate located at the mouth of the bags. When in use the filter bags become clogged a reverse pulse of air is discharged into the bag through the mouth in the plate. That pulse serves to provide an energy wave, which flexes the filter bag, resulting in particulate material which has adhered to the bag during the filtering process being dislodged from the bag and falling to a hopper in the bottom of the bag house.

Prior art systems have tended to use high-pressure low volume reverse pulses of air to clean the filter bags. However, high-pressure systems tend to be costly to operate and maintain, and also tend to be noisy in operation.

SUMMARY OF THE INVENTION

According to a broad aspect of the invention, there is provided an air supply system adapted to provide a reverse pulse of air for cleaning a filter element located in a filter house, said system comprising:

a pressure vessel adapted to contain a volume of compressed air to be used for supplying said reverse pulse, said pressure vessel having a wall with at least one outlet aperture therein;

valve means mounted to said wall around said aperture to control the flow of air from said pressure vessel, said valve means comprising a valve body having an inlet, an outlet and a flow passage connecting the inlet and outlet, said inlet, said outlet and said flow passage generally extending axially through said valve body, a valve seat surrounding said flow passage, and a valve closure member movable towards and away from said valve seat into closed and open positions to thereby close or open said flow passage, and operating means for moving said valve closure member between said closed and open positions; and a conduit mounted to said valve body around said outlet and adapted to extend into said filter house in use so as to direct a pulse of air towards a filter element to be cleaned when said valve closure member is in said open position.

The inlet and outlet may be in general axial alignment with one another.

The valve means may further comprise engagement formations adapted to engage said at least one outlet aperture of said pressure vessel, wherein said valve is at least partially within said pressure vessel.

Optionally, the pressure vessel has a volume which exceeds the volume of air required for a reverse pulse of the system.

Advantageously, the pressure vessel may be a low-pressure system adapted to contain pressure at between 100 and 300 kPa and may contain pressure at between 120 kPa and 150 kPa Furthermore, the pressure vessel may have a circular cylindrical configuration and said aperture may have an axis perpendicular to the cylinder axis.

Optionally, the valve body has a mounting flange or shoulder on an outer surface thereof shaped and configured to engage and seal with the outer surface of the pressure vessel surrounding said aperture. The valve means may further comprise a clamp arrangement mounted thereto adapted to clamp the valve body to the pressure vessel by engagement with an inner surface of the pressure vessel. Optionally, the clamp arrangement is operable from a position exterior of the pressure vessel such that the valve body can be mounted to, or removed from, the pressure vessel from said exterior position. Typically, the clamp arrangement comprises a substantially C-shaped clamp which is in engagement with a bolt which extends axially through the body, rotation of the bolt causing the C-shaped clamp to move towards and away from the body.

The valve may include an internally threaded coupling member adapted to be located within an outlet aperture to engage an inner surface of the pressure vessel, the valve body in use being secured into the coupling member, including engagement formations adapted to engage an inner surface of the pressure vessel, the valve body in use being secured into the coupling member to cause said engagement formations to operatively engage the inner surface to thereby mount the valve to the pressure vessel.

The valve closure member may include a poppet type valve closure member.

Optionally, the valve closure member is spring biased into a closed position.

The poppet type valve closure member may be axially mounted to a stem having a piston on the distal end thereof, the piston being located in and slideable relative to a cylinder which is fixed relative to and axially aligned with the valve body, said valve closure member being moveable by varying the pressure within said cylinder.

The pressure chamber may be located on and aligned with the valve axis.

The body may include turbulent air flow reducing means in the location of the outlet, said turbulent air flow reducing means being adapted to reduce turbulent flow of air within said outlet in use. The turbulent air flow reducing means may include a shroud or cowl shaped extension on the outlet side of the valve.

The conduit may have a constricted end which will serve to increase the velocity of air flow at the outlet.

The system may further comprise a tubular bracket for mounting the conduit as it passes through a wall of a filter house, the tubular bracket comprising an elongate tubular body having an internal wall sized to be a close sliding fit with the external surface of the conduit, the tubular body having an external thread thereon adapted to receive a nut for clamping the bracket to a filter house wall in a relatively rigid arrangement. The tubular body may have a plurality of tapered catches thereon which are biased outwardly but which have the capacity to flex resiliently inwardly as said bracket is inserted into an aperture through a wall of a filter house, and flex outwardly when the tubular bracket is in position to hold the tubular bracket in position.

The valve body may be adapted to be coupled to a coupling ring or annular flange for coupling the valve to the pressure vessel, the flange or coupling ring including means for engaging with the pressure vessel, and the valve body including formations adapted to engage with co-operant formations on the flange or coupling ring to mount the valve body to the flange to coupling ring.

Another broad aspect of the invention provides a valve comprising:

a valve body having an inlet, an outlet, and a flow passage connecting the inlet and outlet, said inlet, said outlet and said flow passage generally extending axially through said valve body;

a valve seat surrounding the flow passage and a valve closure member moveable towards and away from the valve seat to close and open the valve respectively, and the valve closure member comprising:

a poppet-type closure member axially mounted to a stem having a piston on the distal end thereof, the piston being located in and slideable relative to a cylinder which is fixed relative to the valve body, said valve closure member being moveable by varying the pressure within said cylinder.

The inlet and outlet may be in general axial alignment with one another. The valve optionally further comprises engagement formations adapted to engage a wall of a pressure vessel or conduit in use to thereby mount said valve body to said wall in use.

The engagement formations may comprise:

a rod extending through said valve body, said stem, said piston and said valve closure member, said rod being in general axial alignment with said valve body; and a clamp arrangement mounted to said rod, said clamp arrangement being adapted to clamp said valve to a pressure vessel by engagement with an inner surface of said vessel.

The valve may further comprise a biasing means to bias said valve closure member toward said valve seat. The biasing means may include a spring provided on said rod and located between said clamp and said valve closure member.

The clamp arrangement optionally comprises a generally C-shaped clamp which is in threaded engagement with a threaded end of said rod, wherein rotation of said rod causes said generally C-shaped clamp to move toward and away from said valve body.

The valve body may include turbulent flow reducing means in the location of said outlet, said turbulent flow reducing means being adapted to reduce turbulent flow of fluid within said outlet in use. Advantageously, the turbulent flow reducing means reduces the turbulent flow of fluid within said outlet in use, thereby reducing the noise associated with the flow of air through the valve. The turbulent flow reducing means may include a shroud or cowl shaped extension on the outlet side of the valve body.

Advantageously, the valve includes a pilot conduit extending through said valve body into said cylinder, said pilot conduit adapted to be connected to a source of high pressure fluid for increasing the fluid pressure in said conduit to move said valve closure member away from said valve seat and thereby open said valve.

Preferably, release of said source of high pressure fluid from said pilot conduit decreases the fluid pressure in said conduit to cause said biasing means to bias said valve closure member toward said valve seat and thereby close said valve.

A bleed conduit may extend through said piston from said cylinder to said flow passage to allow fluid under pressure in said cylinder to discharge into said flow passage upon release of said source of high pressure fluid. The generally C-shaped clamp may be adapted to clamp to an internal wall of a pressure vessel or a conduit for supplying a reverse pulse of air for reverse pulse cleaning of filter elements.

The outlet may be connected to a conduit adapted to direct a pulse of air toward one or more filter elements to be cleaned when said valve is open.

The valve body may be adapted to be coupled to a coupling ring or annular flange for coupling the valve to a pressure vessel, the annular flange or coupling ring including means for engaging with the pressure vessel, and the valve body includes formations adapted to engage with co-operant formations on the flange or coupling ring to mount the valve body to the flange to coupling ring.

According to yet a further broad aspect of the invention, there is provided a method of cleaning a filter element using a source of pressurised air, said source of pressurised air being supplied to a conduit adapted to extend into a filter house that houses said filter element, said conduit being connectable to said source of pressurised air by a valve, said valve comprising a valve body having an inlet, an outlet, and a flow passage connecting the inlet and outlet, said inlet, said inlet, said outlet and said flow passage generally extending axially through said valve body; a valve seat surrounding said flow passage, and a valve closure member movable towards and away from said valve seat into closed and open positions to thereby respectively close or open said flow passage, and operating means for moving said valve closure member between said closed and open positions, said outlet of said valve body being mounted to said conduit that extends into said filter, said method comprising the step of:

actuating said operating means to move said valve closure member to said open position to introduce a high volume, low pressure reverse pulse of air into said filter element.

The inlet and outlet may be in general axial alignment with one another.

The pulse of air is optionally provided at a pressure of between 100 and 300 kPa and the volume of the pulse of air may be between 50 l and 100 l.

These and further features of the invention will be made apparent from the description of preferred embodiments thereof given below by way of examples. In the description reference is made to the accompanying drawings but the specific features shown in the drawings should not be construed as limiting on the invention.

BRIEF DESCRIPTION OF THE DRAWINGS

A preferred embodiment of the invention will now be described by way of the following non-limiting example, with reference to the accompanying drawings.

DETAILED DESCRIPTION OF THE EMBODIMENTS

Figures 1, 2:
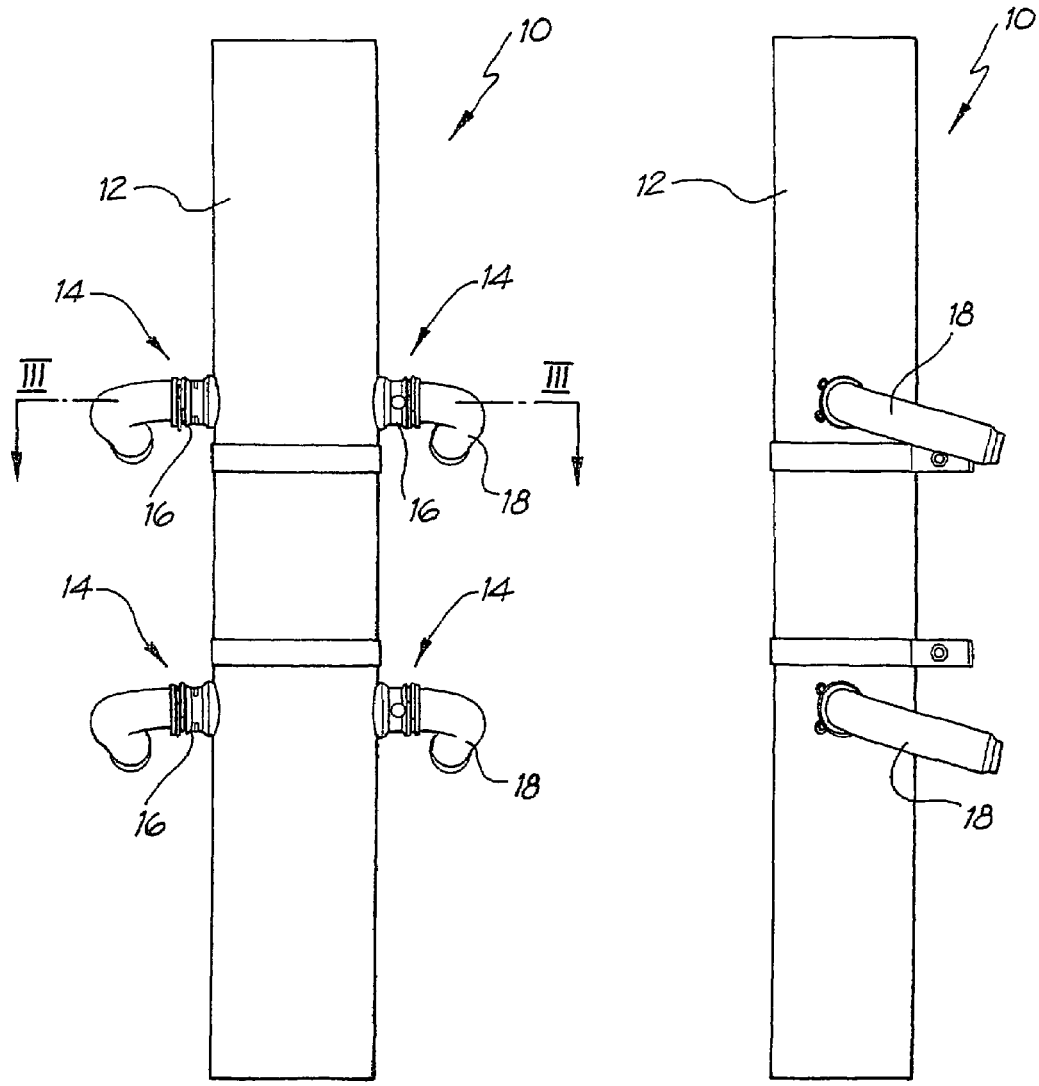
FIG. 1 shows a rear view of a reverse pulse cleaning system which employs four reverse pulse valves.
FIG. 2 shows a side view of the system shown in FIG. 1.
Figure 3:
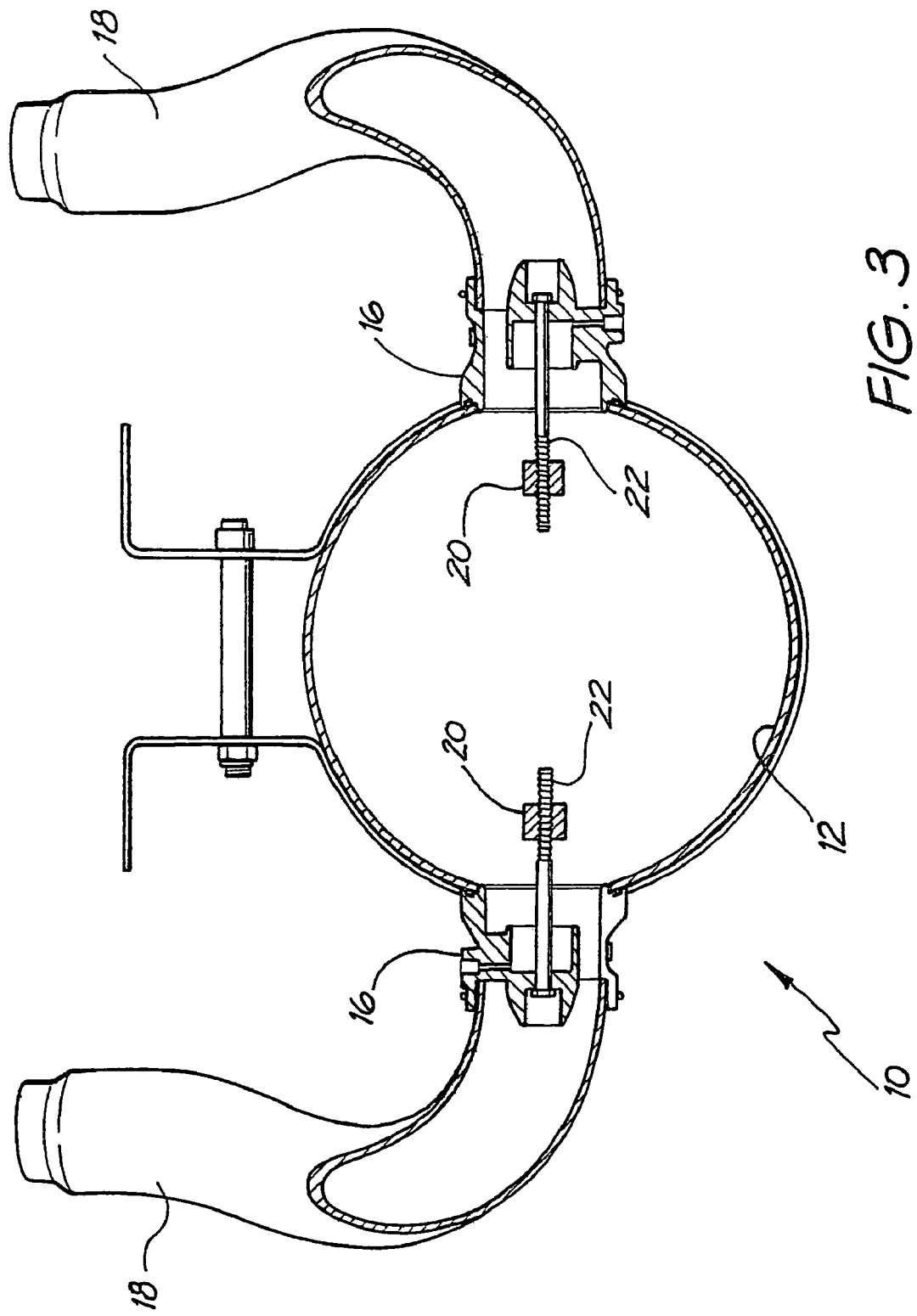
FIG. 3 shows a plan sectional view along line III-III shown in FIG. 1.

As shown in FIGS. 1 to 3, a reverse pulse cleaning system 10 includes a pressure vessel 12 of generally right circular cylindrical configuration having an inlet for air under pressure (not shown) and four outlets 14. Each of the outlets 14 is controlled by respective valve 16 which leads into an outlet conduit 18. The conduits 18 are configured to pass through a wall of a filter house (not shown) and are configured and aligned so as to ensure that an air pulse passing out of the conduits 18 is correctly oriented with the mouth of a filter element to be cleaned. It will be noted, particularly in FIG. 2 that the conduits 18 slope downwardly at angle of approximately 15° since this is the angle at which the filter elements are aligned within the bag house in the embodiment disclosed herein. However, of course, with a different filter house configuration, different conduit shapes and length will be required, and the orientation of the conduits 18 will need to be aligned with the filter elements.

Each of the valves 16 is operated by a separate high pressure pilot conduit which applies high pressure fluid for opening the valves in use. The valves will be opened either at regular intervals, or when their respective filter elements into which they will direct a reverse pulse are clogged to the extent to where they require cleaning. A control system (not shown) will be used to open the respective valves 16 in accordance with a predetermined operating arrangement which does not form part of this invention. However, as will be clear from the description which follows here below, a system of opening the valves in accordance with their required operating protocol is required for a system to operate.

As will be clear from FIG. 3, the valves 16 are mounted to the wall of the vessel 12 in such a manner that the valves can be removed from the vessel 12 from a position exterior of the vessel 12. Also, the vessel 12 does not need to be dismounted in order for individual valves to be removed. The valves 16 are provided with internal mounting brackets 20 which hold the valves 16 firmly against the vessel 12. The brackets 20 are each in the form of a generally c-shaped bridge clamp which is held in position by a threaded rod 22 which is used to tighten the bridge clamp 20 against the inner surface of the vessel 12. These aspects will be described in more detail below.

It will also be noted from FIG. 3 that the valves 16 are configured such that the inlet to the valve and outlet from the valve are axially aligned. This is to ensure there is a minimum pressure drop across the valve when the valve is open which is important to achieve efficient operation of the system. The flow passage through the valve is also of relatively high capacity, with minimal components in the flow passage to interrupt air flow when the valve is open.

The vessel 12 is of relatively large capacity and in the embodiment shown is of approximately 80 litres volume. The vessel is intended to be a relatively low pressure vessel, that is the vessel is designed to withstand an internal pressure of between 100 and 160 kPa, preferably approximately 130 kPa. Typical reverse pulse cleaning systems operate at far higher pressures, often up to approximately 800 kPa but for the reasons mentioned above, including noise of operation, a low pressure system is preferable to provide efficient cleaning of filter elements over a high pressure system.

Figure 4:
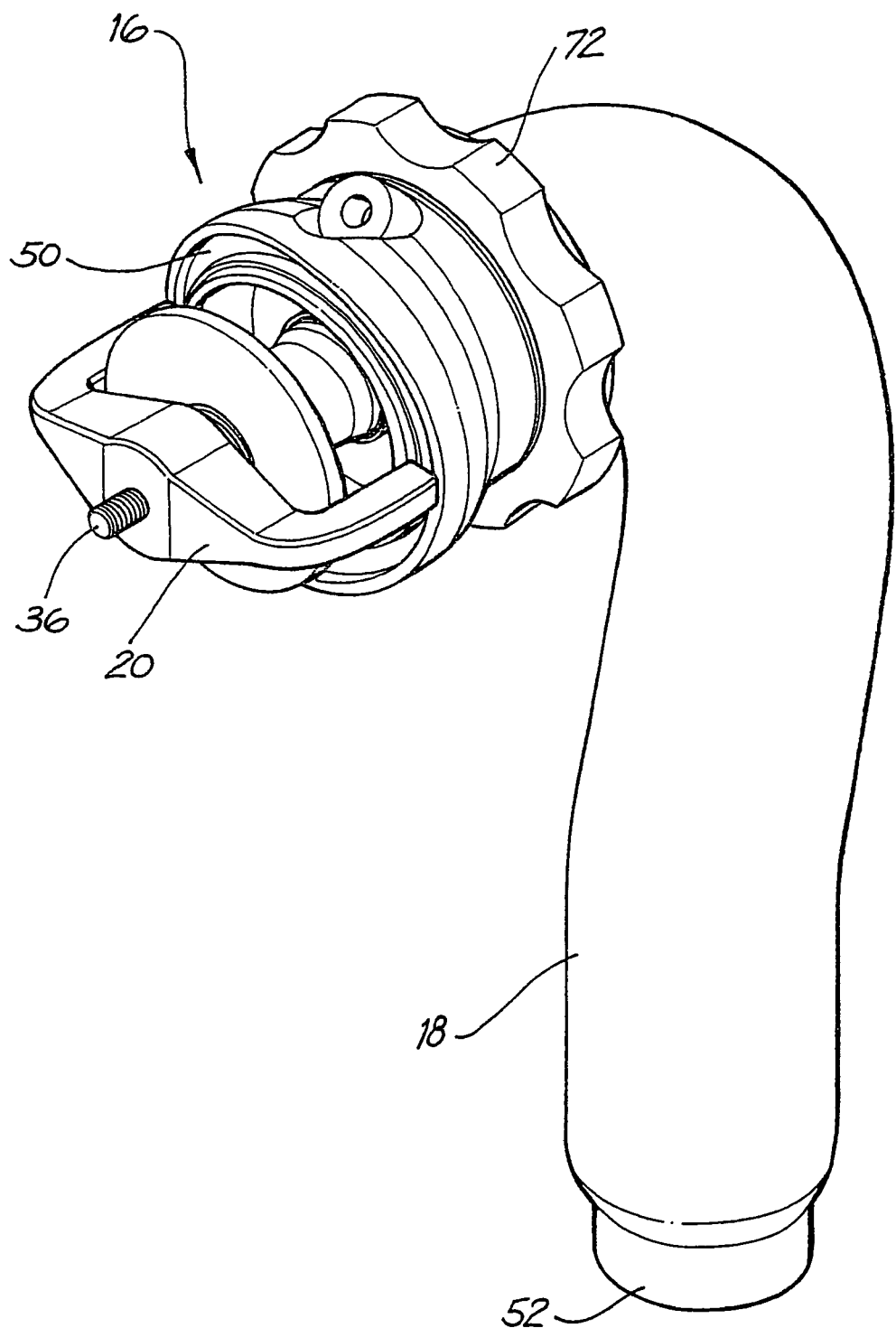
FIG. 4 shows a perspective view of a first embodiment of outlet valve for the system shown in FIGS. 1 to 3.
Figure 5:
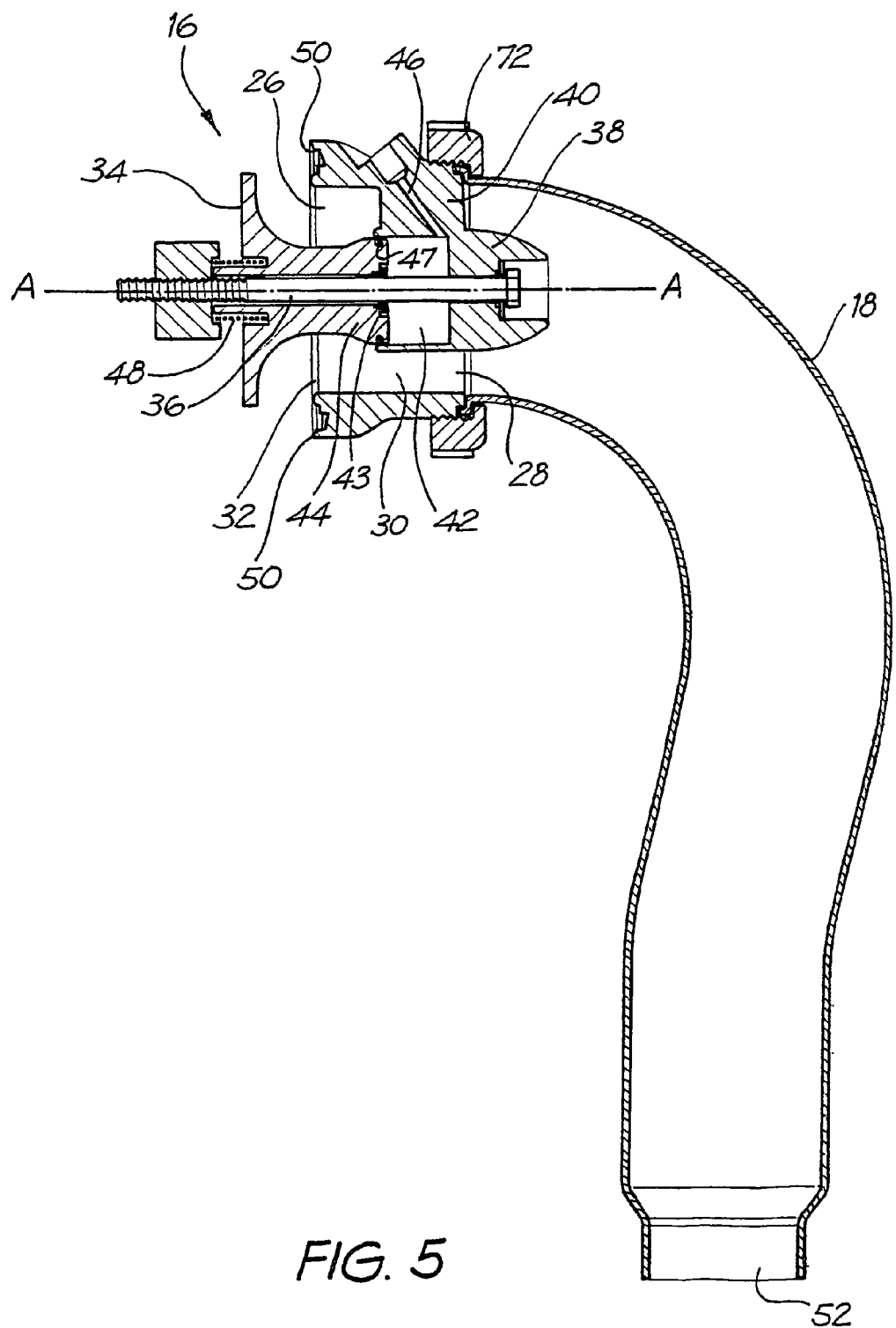
FIG. 5 shows a cross sectional side view of the valve shown in FIG. 4.

Turning now to FIGS. 4 and 5, a valve 16 of the type which is suitable for use with the system depicted in FIGS. 1 to 3 is shown in more detail. As shown, the valve 16 includes a valve body 24 which is of generally tubular configuration and has an inlet 26 and outlet 28 coaxially aligned with the inlet 26. A flow passage 30 extends between the inlet and the outlet and a valve seat 32 surrounds the flow passage. As shown by the dashed line A-A, which shows the axis of the valve body 24, the inlet 26, outlet 28 and flow passage 30 extend axially through the valve body 24 and the inlet 26 and outlet 28 are in general axial alignment with one another.

A poppet type valve closure member 34 is moveable towards and away from the valve seat in order to close and open the valve. The poppet type valve closure member 34 is slideable on a rod 36 which lies on the valve axis and is supported in a central boss 38 which is connected to the valve body 24 via a web 40. The boss 38 defines a pressure chamber 42 and the valve closure member 34 includes a piston 44 on its distal end which locates within the pressure chamber 42, the pressure chamber 42 thus serving as a cylinder. A high-pressure fluid supply line 46 extends through the web 40 into the pressure chamber 42, and high-pressure fluid passing through the passage 46 into the cylinder 42 will cause the valve 34 to open. A compression spring 48 biases the valve into a closed position.

A recess is provided adjacent to the piston 44 to allow a seal 47 to be located around the body the piston to seal the piston and the inner wall of the chamber 42. Another recess is provided in the piston 44 to allow a seal 43 to seal between the piston 44 and the rod 32.

Thus, the valve 16 will typically be in a closed position under the influence of the compression spring 48, but when it is necessary to open the valve a high-pressure line connected into passage 46 will opened to pressurise the pressure chamber 42 and open the valve. A small diameter bleed conduit (not shown in the drawings) extends through the piston 44, between the chamber 42 and the flow passage 30 to allow fluid to release form the chamber 42 when high pressure air is not being supplied to passage 46 to thereby reduce the pressure in the chamber 42. In this embodiment, the internal diameter of the bleed conduit is 1.22 mm and the internal diameter of the passage 46 is 2.5 mm, so that pressure can build up in chamber 42 when the valve closure member is in the open position.

It will be noted that when the valve closure member 34 is in its open position, as shown, the valve 16 defines a relatively straight flow through passage, which will result in a very low pressure drop across the valve. Thus, when the valve is open, substantially the entire content of air under pressure in the pressure vessel 12 will discharge very rapidly through the open valve, down conduit 18, to the filter element. Hence, it will be appreciated that the valve 16, when in its open position provides a very efficient valve in that it minimises pressure drop from the pressure vessel 12 to the conduit 18 due to the inlet 26, flow passage 30 and outlet 28 being generally axially aligned. Furthermore, the reduced pressure drop as air passes through valve 16 also provides the advantage of reducing noise associated with the release of air under pressure in the pressure vessel 12. Hence, the valve 16 can be used to reduce noise associated with reverse pulse air cleaning systems, which is highly desirable in promoting reduced noise working environments.

It will also be appreciated that the valve closure member 34 could be used in applications other than in reverse pulse cleaning systems, particularly in applications where it is desirable to use a valve that provides a reduced pressure drop of fluid upon opening the valve.

The bridge clamp 20 is shown in more detail in FIG. 4 of the drawings. It will be noted that the bridge clamp 20 is of substantially C-shaped configuration and the rod 36, which is screw threaded on its distal end, screws into the bridge clamp 20. Rotation of the rod 36 will cause the bridge clamp 20 to move towards the inner surface of the pressure vessel 12 to thereby clamp the valve against the outer surface of the pressure vessel.

It will be noted that the valve body 24 includes a saddle shaped sealing surface 50 which will seal against the outer surface of the pressure vessel 12 when the valve is tightly clamped against the pressure vessel. This will eliminated any air leakage out of the pressure vessel 12 when the valve is closed.

It will be noted that the conduit 18 has a reduced diameter outlet end 52 which will increase the velocity of air leaving the conduit and the outlet region, thereby increasing the efficiency of the pulse air to be used to clean the filter element. The end 52 might have a configuration which differs from that depicted in the drawings, depending on the nature of the filter element to be cleaned, and the desired exit velocity of the reverse pulse of air.

Figure 6:
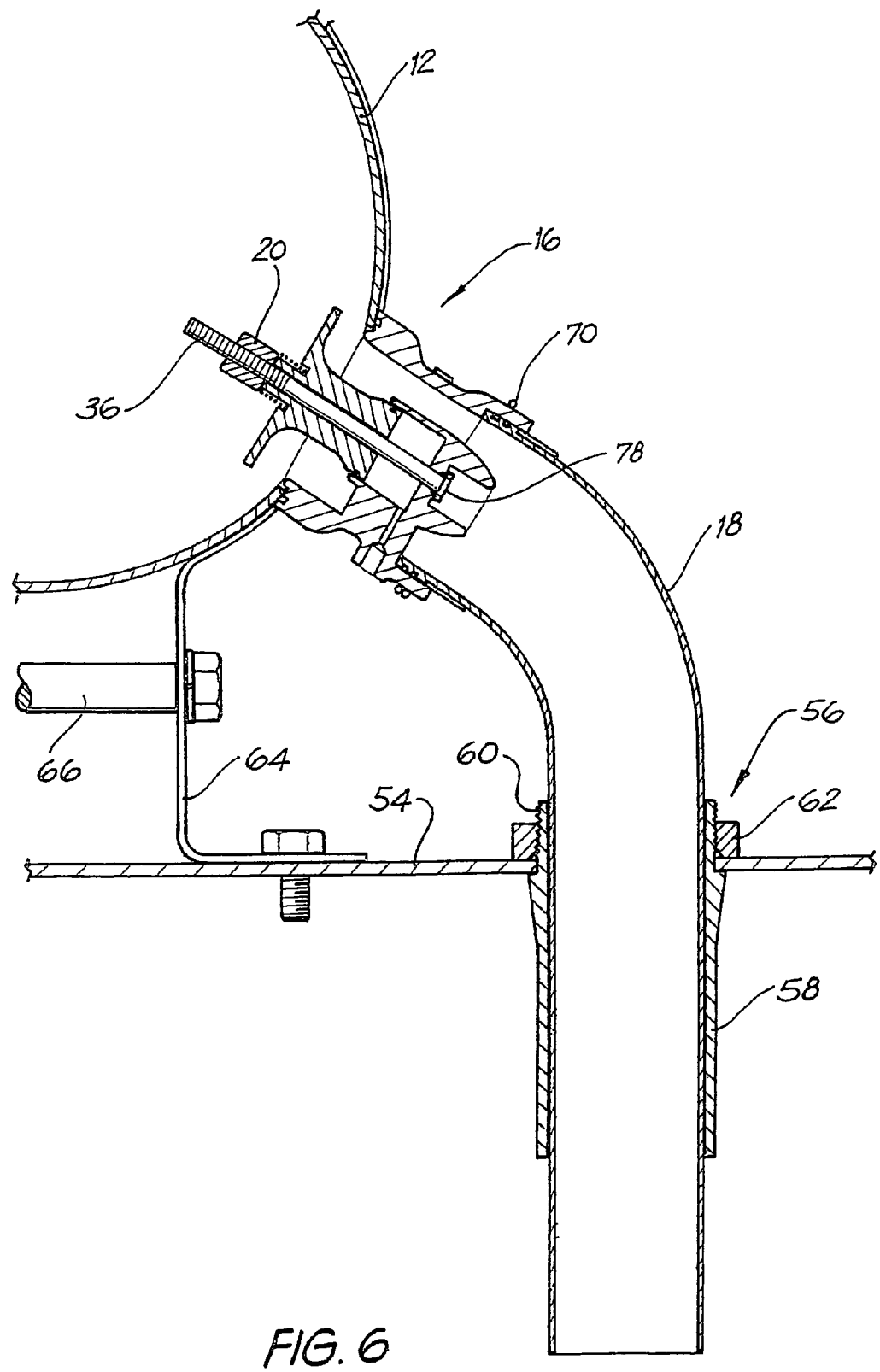
FIG. 6 shows a cross sectional plan view of a system similar to that shown in FIG. 1 to 3 with a conduit attached to the valve which in turn passes through a wall of a filter house.

Turning to FIG. 6 of the drawings it will be noted that a conduit 18 is shown passing through a wall 54 of a bag house or filter house. It should be noted that reference numerals have been omitted from some of the features in FIG. 6 for clarity. The conduit 18 passes through the wall 54 and is supported by a tubular bracket 56 which provides support for the conduit 18 and perpendicular alignment with the wall 54. The tubular bracket 56 includes a tubular body 58, an outer end of which is screw threaded as indicated at numeral 60, and a union nut 62 secures the tubular bracket in position and clamps the bracket around the conduit 18. When in position, the bracket will ensure that the conduit 18 is correctly aligned with the filter elements located within the bag house.

It will also be noted that the vessel 12 is supported on the wall 54 via a bracket 64, the bracket 64 including a nut and bolt assembly 66 which ensures the bracket 64 is properly clamped around the vessel 12, and a bolt 68 which secure the bracket 64 and hence the vessel 12, to the wall 54.

A clip 70 is used to secure the conduit 18 to the valve 16, the conduit 18 locating within an outlet region of the valve 16. In the embodiments shown in the FIGS. 4 and 5, the conduit 18 is held to the valve 16 via a union nut 72.

It will be clear from FIG. 6 that one of the advantages of the valve used with the system is that it is possible to remove the valve 16 from the vessel 12 without removing the vessel 12 from position. In order to remove the valve, for maintenance, repair or other purposes, the clip 70 will be removed from the conduit 18 and the union nut 72 removed from the bracket 56. This will allow the conduit to be rotated away from the valve 16 which in turn will expose the hexagonal head 78 of the rod 36. Rotation of the rod 36 using a suitable tool applied to the hexagonal head 78 will cause the bracket 20 to come out of contact within a wall of the vessel 12. Once the valve and bracket become loose this could be a simple matter to manipulate the valve so as to extract the portions of the valve located within the vessel 12, including the bracket 20, from the interior of the vessel 12. This ability to allow for quick disengagement of the valve 16 from the vessel 12 is considered to be a significant advantage of the assemblies described herein.

Figure 8:
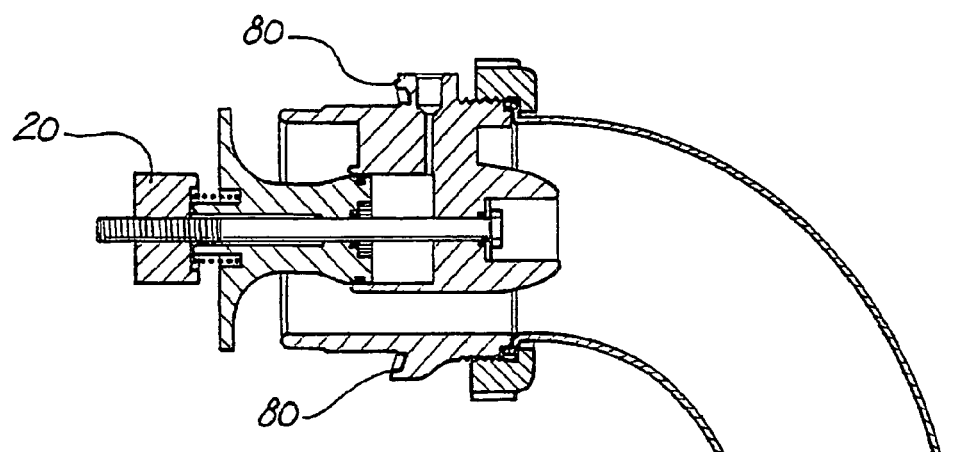
FIG. 8 shows a cross sectional side view of the valve shown in FIG. 7.
Figure 7:
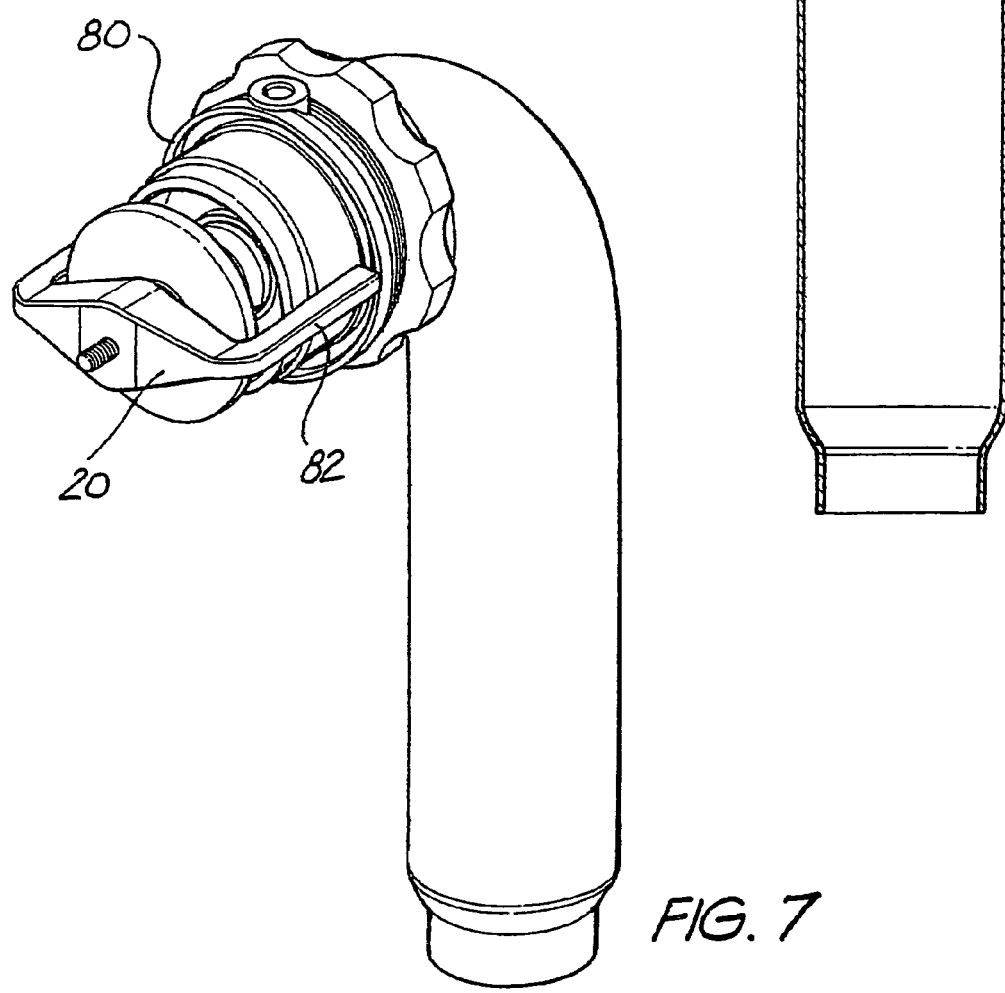
FIG. 7 shows a perspective view of a third embodiment of valve with the conduit attached thereto.

The valve shown in FIGS. 7 and 8 of the drawings (it should be noted that reference numerals have been omitted from some of the features in FIG. 7 and FIG. 8 for clarity) is similar to that of the previous embodiment except that the seat 80 which is adapted to engage against the outer surface of the vessel 12 is set back from the inlet end of the valve body. This will ensure that a significant portion of the valve body is located within the vessel 12 when the valve is operatively mounted to a vessel 12. By mounting the valve in this way, only a small portion of the valve body will project out of the vessel 12, and this will allow more space for the conduit 18 to fit with particular complicated configurations of bag house with which the system is to be used. Where the seat 80 is set back, as shown in FIGS. 7 and 8, the arms 32 of the bridge clamp 20 will need to be longer than the arms shown in FIG. 4 of the drawings.

Clearly the seat 80 needs to be configured so as to seal with the outer surface of the vessel 12. Where the vessel 12 is of rectangular shape, for example the seat 80 will not need to be saddle shaped but could in that instance, be perpendicular to the valve axis.

Turning now to the valve shown in FIGS. 9 to 12 of the drawings, it will be noted that the valve shown adopts a different method of coupling the valve to the pressure vessel, but the valve is still able to be mounted to and removed from the vessel from a position exterior of the pressure vessel. In this embodiment the valve uses a coupling ring 82 to connect the valve body to the pressure vessel 12. In the drawings for clarity reasons the valve is shown without the poppet type valve closure member mounted thereto.

As shown, the valve 84 comprises a valve body 86 having screw threads 88 formed around the inlet end 90 thereof, and screw threads 92 formed on the outlet end thereof for mounting a conduit thereto.

The coupling ring 82 is adapted to be mounted to the pressure vessel first, and the valve body is then screwed into the coupling ring in the manner described below. The coupling ring comprises an inner ring 94 and an outer ring 96. The inner ring 94 has four integral fingers 98 which project forwardly, that is, into the pressure vessel when the coupling ring is operatively mounted to a pressure vessel. The fingers 98 are flexible and have outwardly projecting shoulders 100 thereon adapted to locate within the pressure vessel and engage with the inner surface of the pressure vessel to securely mount the valve to the pressure vessel. The shoulders 100 have forward and rearward facing tapered surfaces 102 to allow the inner ring to be pressed into and removed from the outlet aperture in the pressure vessel.

The inner ring 94 is internally threaded with threads 95 configured to engage with the threads 88 on the valve body. The inner ring 94 includes a spline 104 on the outer surface thereof aligned with the valve axis and adapted to locate within one of two slots 106 formed in the inner surface of the outer ring 96 which will allow the two rings to slide axially relative to each other.

The outer ring 96 has a saddle shaped forward facing surface 108 adapted to seat against and seal with the outer surface of the pressure vessel 12. To mount the valve 84 to the pressure vessel firstly an aperture of diameter which matches the outer diameter of the inner ring will be bored into the wall of the pressure vessel. A small slot will also be formed at the appropriate position in the edge of that aperture to receive the spline 104. This will ensure the saddle shaped surface 108 is correctly aligned with the outer surface of the pressure vessel.

Figure 9:
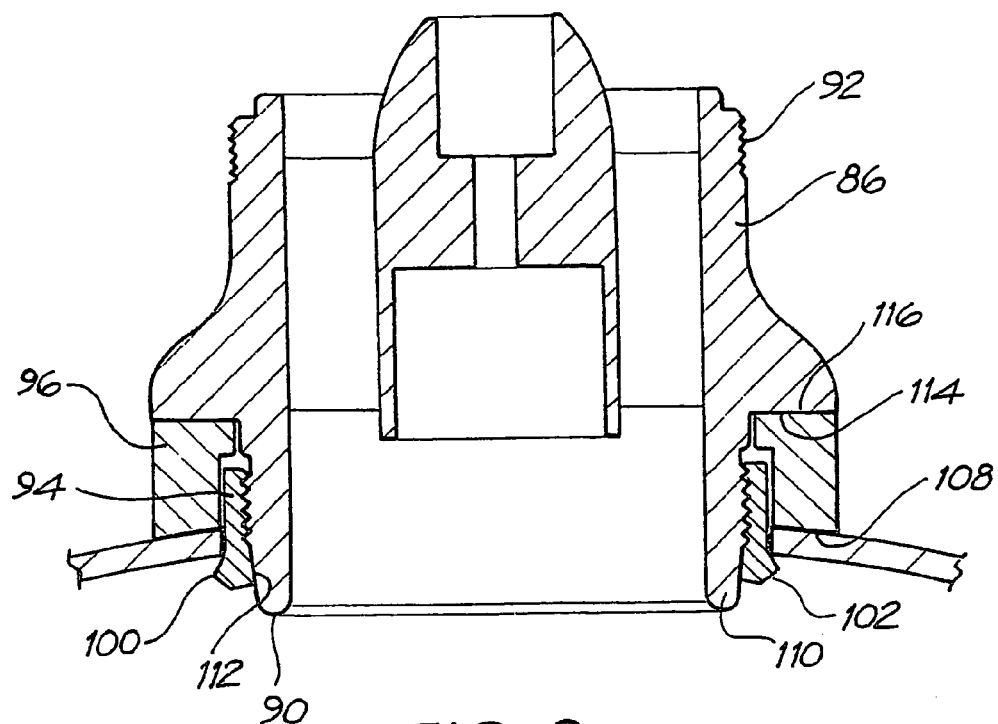
FIG. 9 shows a cross sectional side view of a fourth embodiment of valve mounted to a pressure vessel via a two part coupling ring.
Figure 10:
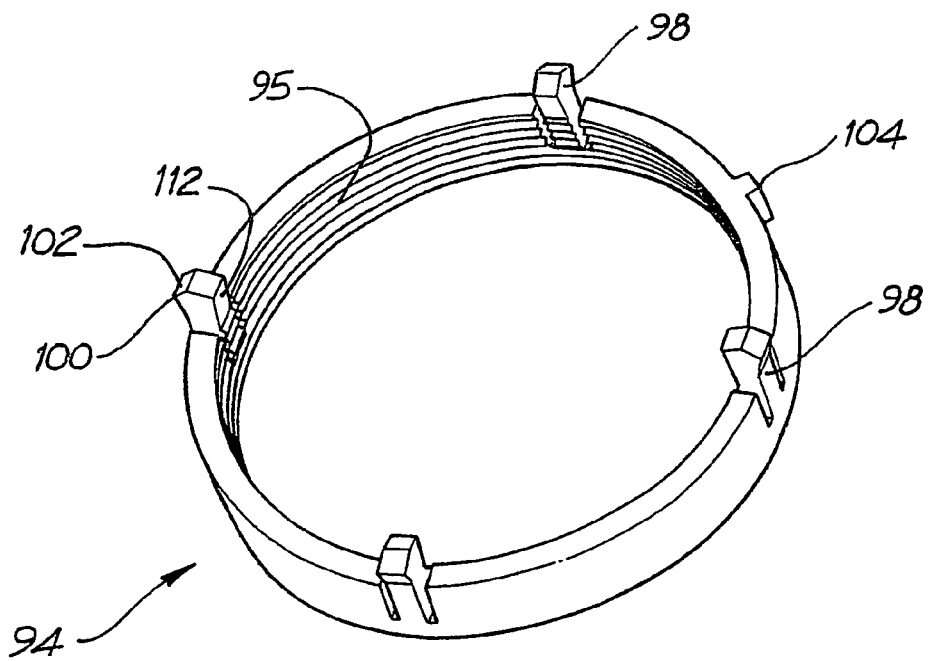
FIG. 10 shows the inner part of the coupling ring for use in mounting the valve of FIG. 9 to the pressure vessel.
Figure 11:
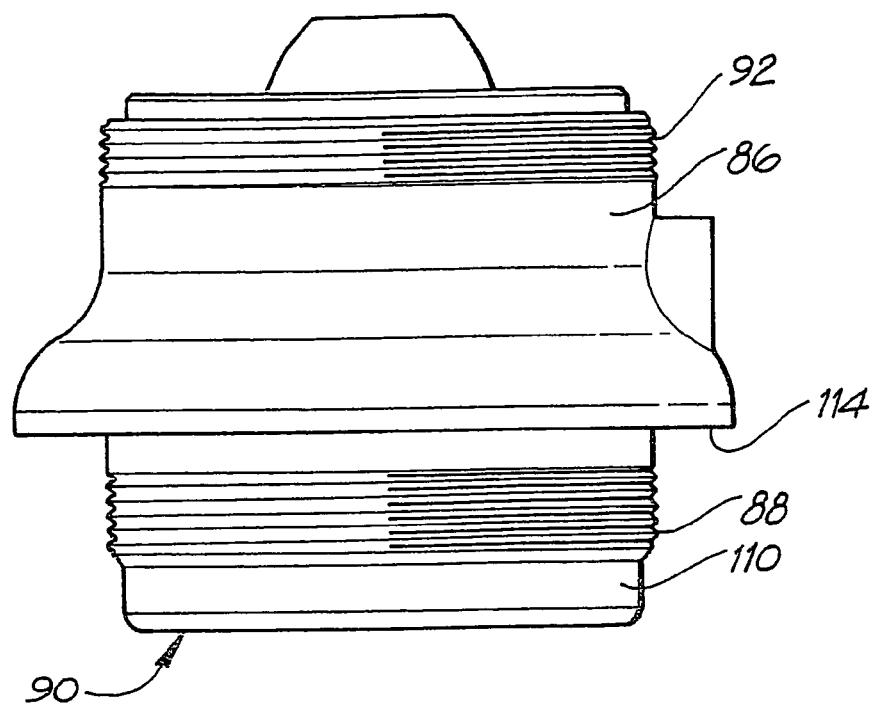
FIG. 11 shows the valve of FIG. 9 without the coupling ring located thereon.
Figure 12:
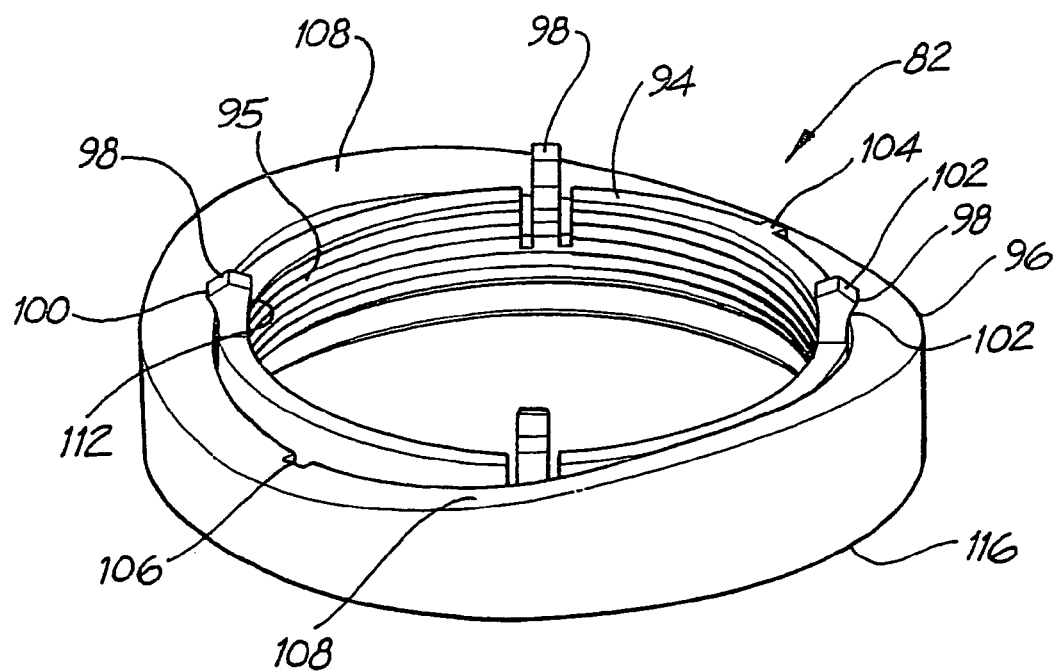
FIG. 12 show the inner and outer parts of the coupling ring together.

The inner ring will then be pushed into the aperture, causing the fingers 98 to flex inwardly until the shoulders 100 have moved past the wall of the pressure vessel into the interior of the vessel. Thereafter the outer ring will be located around the rearward end of the inner ring, and the valve body will be screwed into the threads 95. The valve body has a forward facing neck portion 110 on its inlet end which defines the valve seat for the poppet valve closure member. The fingers 98 have a radially inner surface 112 which is tapered as shown in FIG. 9, and projects slightly into the path of the neck portion 110 so that when the valve body is screwed fully into the coupling ring the neck portion 110 will engage the inner surfaces 112 of the four fingers and urge the fingers outwardly into engagement with the pressure vessel, thereby locking the shoulders 100 against the inner surface of the pressure vessel.

The valve body has a forward facing shoulder 114 which presses against the rearward face 116 of the outer ring. When the valve body is screwed fully into the inner ring the shoulder 114 will press against the face 116 pressing the outer ring hard against the outer surface of the pressure vessel. Seals, typically O-ring seals (not shown) will be located in the surfaces 108 and 116 to ensure that no leakage out of the valve will take place around the edge of the valve.

To remove the valve from the pressure vessel the valve will simply be unscrewed. With the valve out of engagement with the fingers the fingers will be free to flex inwardly so that the coupling ring can be removed from the pressure vessel if necessary. The coupling ring thus serves as a relatively simple connection arrangement which allows for mounting of the valve from a position exterior of the pressure vessel, and also allows for rapid replacement of the valve for maintenance or repair purposes.

This ability to replace valves quickly can be important. With many prior art systems, valve replacement can involve lengthy and complex disassembly of the whole cleaning system, resulting in lengthy interruption of the plant in which the filter house is located. With the present system, valve replacement can be done in a matter of minutes without specialist personnel.

Figure 13:
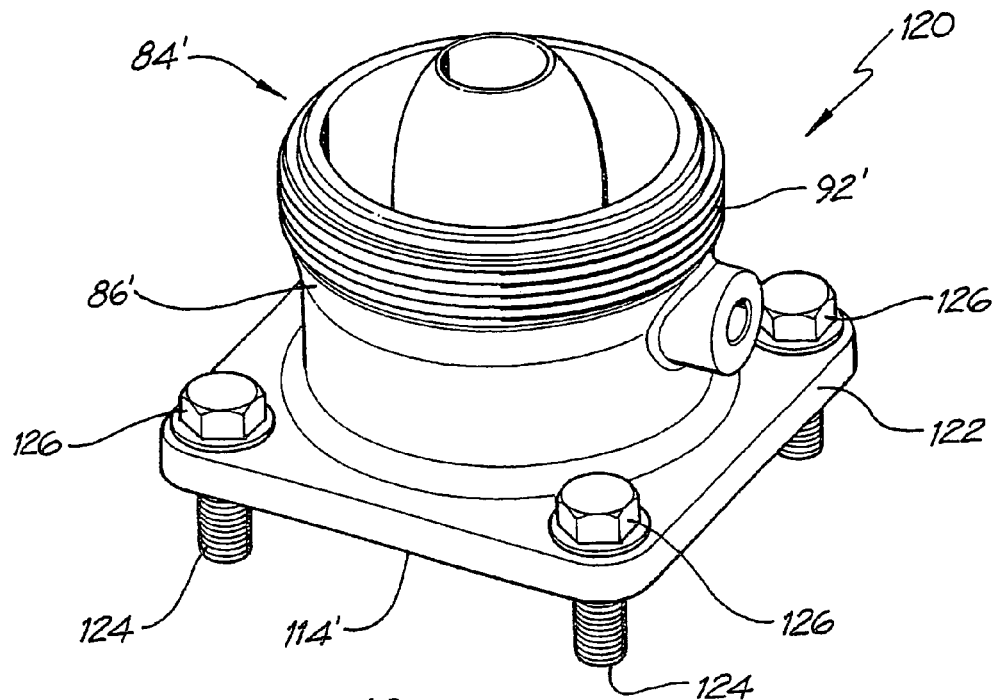
FIG. 13 shows a perspective view of an alternative mounting arrangement in the form of a flange mounting assembly for mounting the valve of FIG. 9 to the pressure vessel.

Referring now to FIG. 13, there is shown yet another alternative assembly 120 for coupling valve 84' to the pressure vessel 12'. The features of valve 84' are similar to those described for valve 84 and hence, similar features will be marked with the same reference numeral including the quotation mark (') for convenience and the description of those features will not be repeated.

Figure 14:
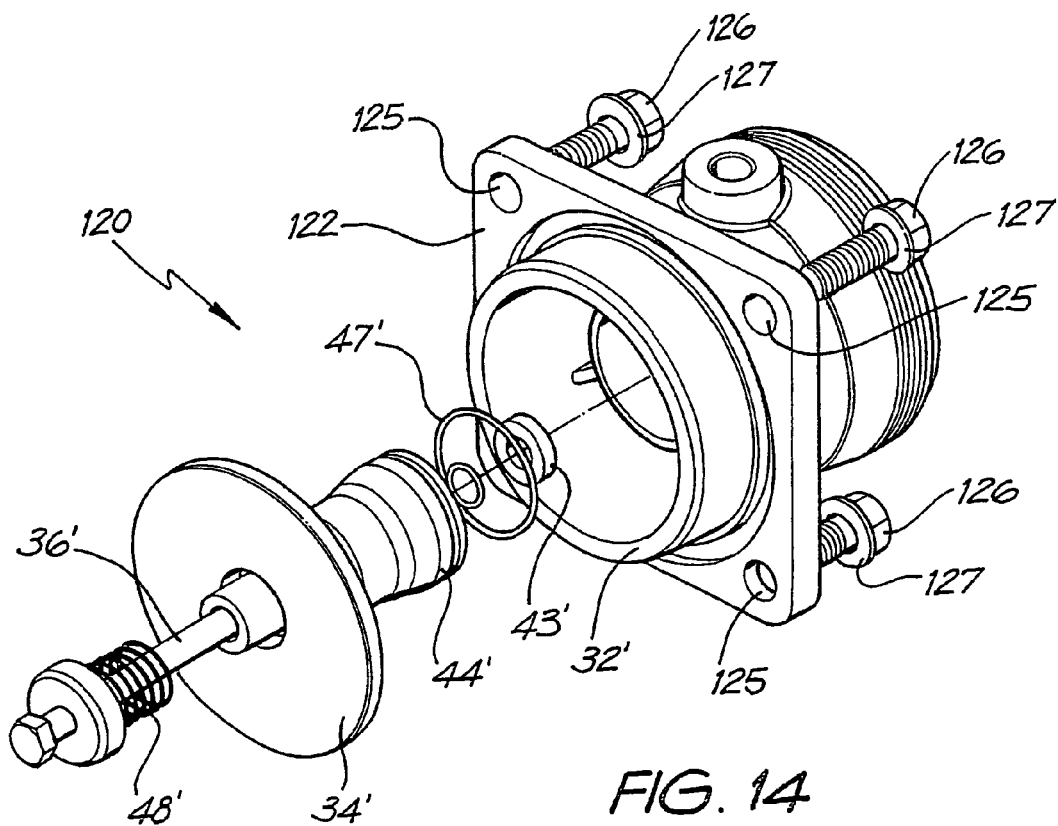
FIG. 14 shows a perspective exploded view of the mounting arrangement of FIG. 13.
Figure 15:
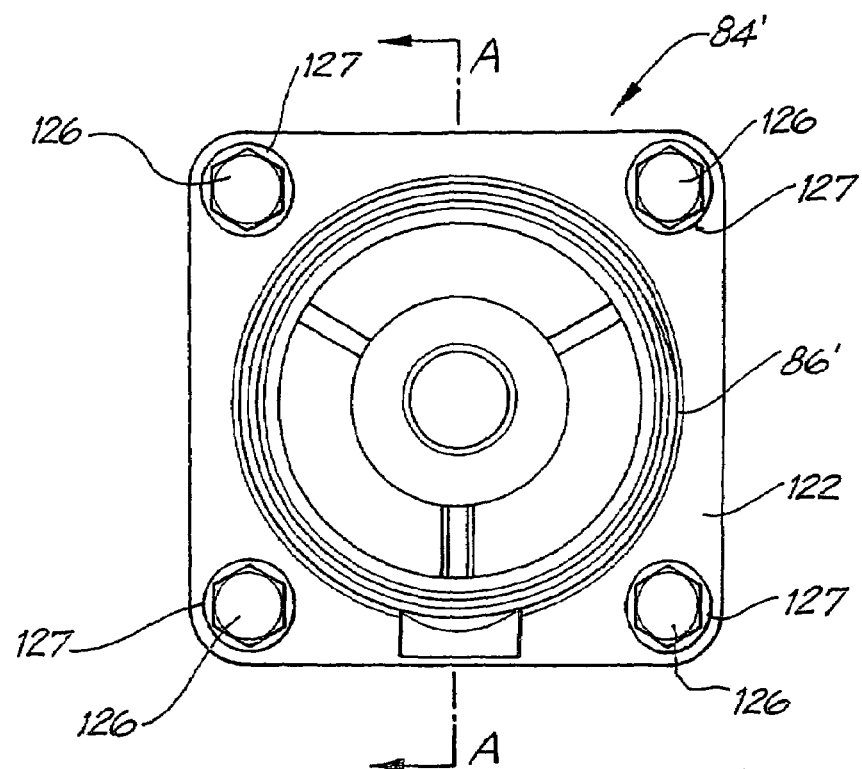
FIG. 15 shows the mounting arrangement of FIG. 13 from a top view.
Figure 16:
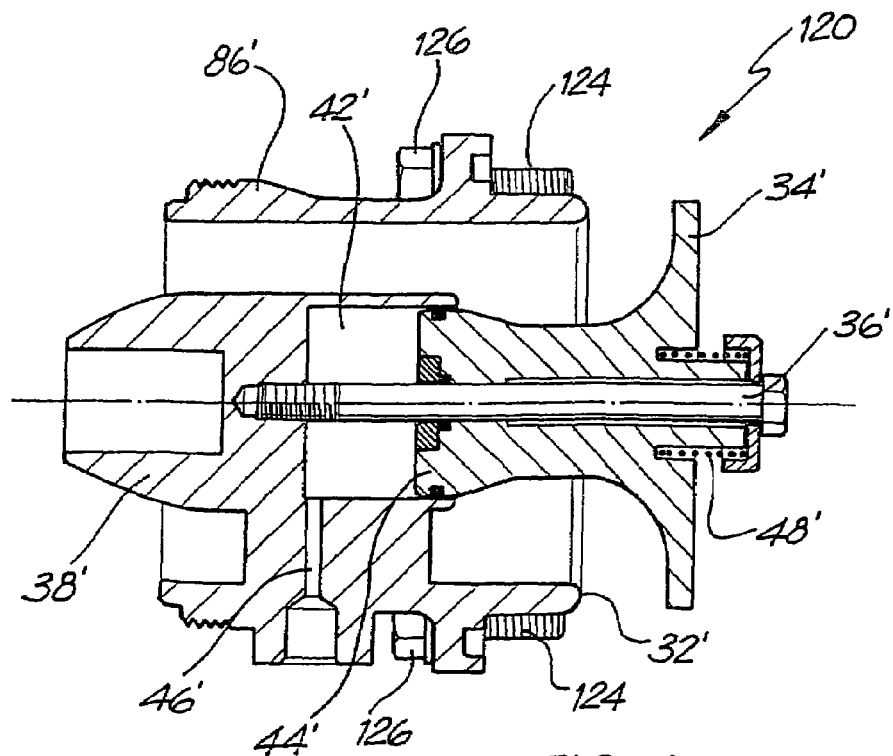
FIG. 16 shows a cross-sectional view the line A-A of FIG. 15.
Figure 17:
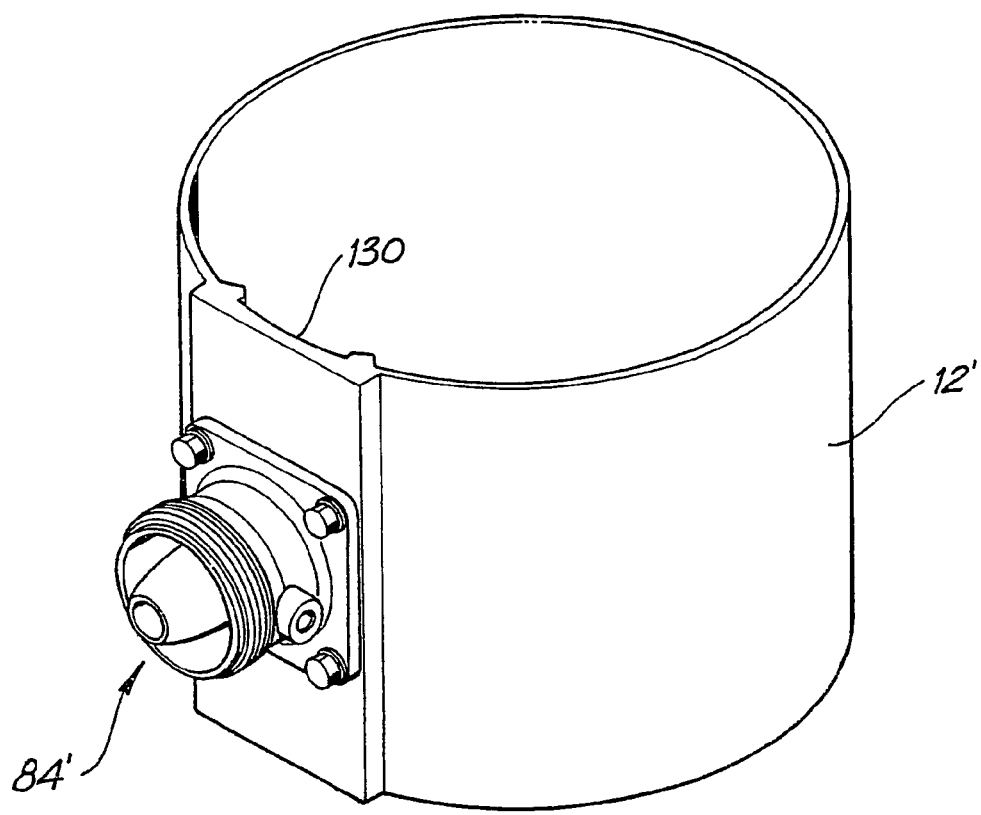
FIG. 17 shows a perspective view of the mounting arrangement of FIG. 13 mounted to a pressure vessel.
Figure 18:
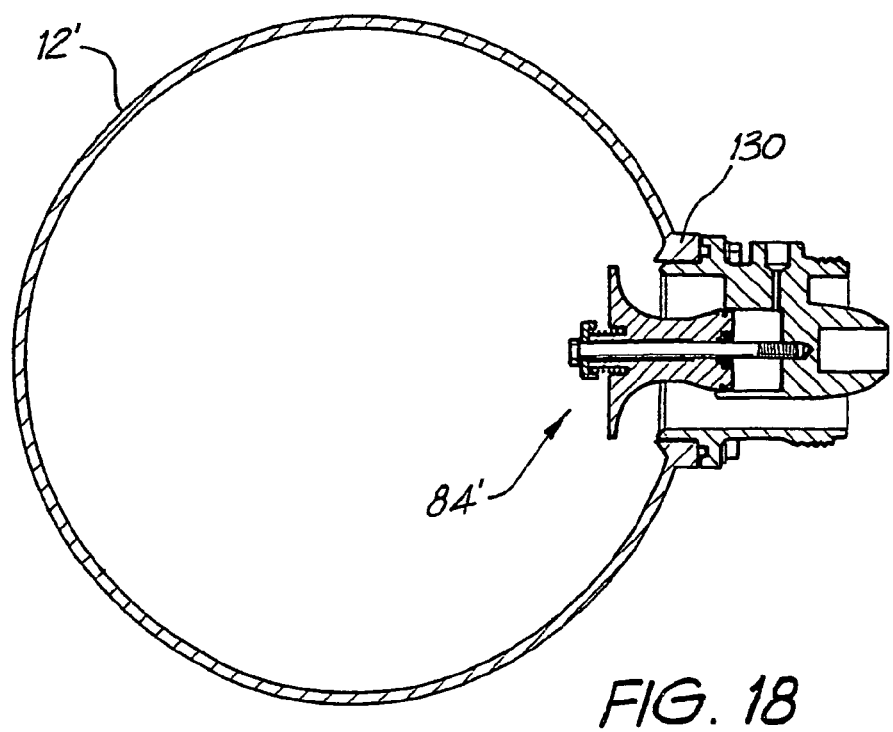
FIG. 18 shows a cross-sectional view of FIG. 17.

FIG. 14 shows a rear perspective exploded view of the mounting arrangement 120 of FIG. 13; FIG. 15 shows the mounting arrangement 120 of FIG. 13 from a top view; and FIG. 16 shows a cross-sectional view the line A-A of FIG. 15. FIG. 17 shows a perspective view of the mounting arrangement of FIG. 13 mounted to a pressure vessel 12'; and FIG. 18 shows a cross-sectional view of FIG. 17. It should be noted that reference numerals have been omitted from some of the features in FIG. 17 and FIG. 18 for clarity.

The valve 84' includes valve body 86' which includes a flange 122 that is generally square shaped in top view and which extends outwardly from the flange body 86'. At each corner of the flange 122, attachment bores extend through the body of the flange 122 to allow bolts 126 to be inserted therein and allow the flange 122 to be attached to a plate 130 attached to pressure vessel 12' as shown in FIG. 17 and FIG. 18.

Washers 127 are also provided between the head of the bolt 124 and the flange 122 to provide a seat for the bolt head and ensure good attachment between the flange 122 and plate 130.

In installation, the flange 122 is connected the plate 130 by drilling holes through the plate 130 such that the attachment bores are aligned with the holes 125 of the flange 122. The flange 122 is connected to the plate 130 by inserting the bolts 124 through the attachment holes and fastening the bolts 124 using threaded nuts (not shown). The plate 130 is attached to the pressure vessel 12'.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. An air supply system adapted to provide a reverse pulse of air for cleaning a filter element located in a filter house, said system comprising:
    a pressure vessel adapted to contain a volume of compressed air to be used for supplying said reverse pulse, said pressure vessel having a wall with at least one outlet aperture therein;
    valve means mounted to said wall around said aperture to control the flow of air from said pressure vessel, said valve means comprising a valve body having an inlet, an outlet and a flow passage connecting the inlet and outlet, said inlet, said outlet and said flow passage generally extending axially through said valve body, a valve seat surrounding said flow passage, and a valve closure member movable towards and away from said valve seat into closed and open positions to thereby close or open said flow passage, and operating means for moving said valve closure member between said closed and open positions; and
    a conduit mounted to said valve body around said outlet and outside of said pressure vessel, said conduit adapted to extend into said filter house in use so as to direct a pulse of air towards a filter element to be cleaned when said valve closure member is in said open position.

2. An air supply system according to claim 1, wherein the inlet and outlet are in general axial alignment with one another.

3. An air supply system according to claim 1, wherein the valve means further comprises engagement formations adapted to engage said at least one outlet aperture of said pressure vessel, wherein said valve is at least partially within said pressure vessel.

4. An air supply system according to claim 1, wherein the pressure vessel has a volume which exceeds the volume of air required for a reverse pulse of the system.

5. An air supply system according to claim 1, wherein the pressure vessel is a low-pressure system adapted to contain pressure at between 100 and 300 kPa.

6. An air supply system according to claim 5, wherein the pressure vessel is adapted to contain pressure at between 120 kPa and 150 kPa.

7. An air supply system according to claim 1, wherein said pressure vessel is of right circular cylindrical configuration and said aperture has an axis perpendicular to the cylinder axis.

8. An air supply system according to claim 1, wherein the valve body has a mounting flange or shoulder on an outer surface thereof shaped and configured to engage and seal with the outer surface of the pressure vessel surrounding said aperture.

9. An air supply system according to claim 8, wherein the valve means further comprises a clamp arrangement mounted thereto adapted to clamp the valve body to the pressure vessel by engagement with an inner surface of the pressure vessel.

10. An air supply system according to claim 9, wherein the clamp arrangement is operable from a position exterior of the pressure vessel such that the valve body can be mounted to, or removed from, the pressure vessel from said exterior position.

11. An air supply system according to claim 10, wherein the clamp arrangement comprises a substantially C-shaped clamp which is in engagement with a bolt which extends axially through the body, rotation of the bolt causing the C-shaped clamp to move towards and away from the body.

12. An air supply system according to claim 8, wherein the valve includes an internally threaded coupling member adapted to be located within an outlet aperture to engage an inner surface of the pressure vessel, the valve body in use being secured into the coupling member, including engagement formations adapted to engage an inner surface of the pressure vessel, the valve body in use being secured into the coupling member to cause said engagement formations to operatively engage the inner surface to thereby mount the valve to the pressure vessel.

13. An air supply system according to claim 8, wherein the valve closure member includes a poppet valve closure member.

14. An air supply system according to claim 13, wherein the valve closure member is spring biased into a closed position.

15. An air supply system according to claim 13, wherein the poppet valve closure member is axially mounted to a stem having a piston on the distal end thereof, the piston being located in and slideable relative to a cylinder which is fixed relative to and axially aligned with the valve body, said valve closure member being moveable by varying the pressure within said cylinder.

16. An air supply system according to claim 15, wherein the pressure chamber is located on and aligned with the valve axis.

17. An air supply system according to claim 13, wherein the body includes turbulent air flow reducing means in the location of the outlet, said turbulent air flow reducing means being adapted to reduce turbulent flow of air within said outlet m use.

18. An air supply system according to claim 17, wherein the turbulent air flow reducing means includes a shroud or cowl shaped extension on the outlet side of the pressure chamber.

19. An air supply system according to claim 1, wherein the conduit has a constricted end which will serve to increase the velocity of air flow at the outlet.

20. An air supply system according to claim 1, further comprising a tubular bracket for mounting the conduit as it passes through a wall of a filter house, the tubular bracket comprising an elongate tubular body having an internal wall sized to be a close sliding fit with the external surface of the conduit, the tubular body having an external thread thereon adapted to receive a nut for clamping the bracket to a filter house wall in a relatively rigid arrangement.

21. An air supply system according to claim 20, wherein the tubular body has a plurality of tapered catches thereon which are biased outwardly but which have the capacity to flex resiliently inwardly as said bracket is inserted into an aperture through a wall of a filter house, and flex outwardly when the tubular bracket is in position to hold the tubular bracket in position.

22. An air supply system according to claim 1, wherein the valve body is adapted to be coupled to a coupling ring or annular flange for coupling the valve to the pressure vessel, the flange or coupling ring including means for engaging with the pressure vessel, and the valve body including formations adapted to engage with co-operant formations on the flange or coupling ring to mount the valve body to the flange to coupling ring.

23. A valve comprising:
a valve body having an inlet, an outlet, and a flow passage connecting the inlet and outlet, said inlet, said outlet and said flow passage generally extending axially through said valve body;
a valve seat surrounding the flow passage and a valve closure member moveable towards and away from the valve seat to close and open the valve respectively;
the valve closure member comprising:
a poppet closure member axially mounted to a stem having a piston on the distal end thereof, the piston being located in and slideable relative to a cylinder which is fixed relative to the valve body, said valve closure member being moveable by varying the pressure within said cylinder, and
a pilot conduit extending through said valve body into said cylinder, said pilot conduit adapted to be connected to a source of high pressure fluid for increasing the fluid pressure in said conduit to move said valve closure member away from said valve seat and thereby open said valve.

24. A valve as claimed in claim 23, wherein the inlet and outlet are in general axial alignment with one another.

25. A valve according to claim 23 or claim 24, further comprising engagement formations adapted to engage a wall of a pressure vessel or conduit in use to thereby mount said valve body to said wall in use.

26. A valve according to claim 25, where the engagement formations comprise a rod extending through said valve body, said stem, said piston and said valve closure member, said rod being in general axial alignment with said valve body; and a clamp arrangement mounted to said rod, said clamp arrangement being adapted to clamp said valve to a pressure vessel by engagement with an inner surface of said vessel.

27. A valve according to claim 23 or 24, further comprising a biasing means to bias said valve closure member toward said valve seat.

28. A valve according to claim 27, wherein the biasing means includes a spring provided on said rod and located between said clamp and said valve closure member.

29. A valve according to claim 26, wherein the clamp arrangement comprises a generally C-shaped clamp which is in threaded engagement with a threaded end of said rod, wherein rotation of said rod causes said generally C shaped clamp to move toward and away from said valve body.

30. A valve according to any one of claim 23 or 24, wherein the valve body includes turbulent flow reducing means in the location of said outlet, said turbulent flow reducing means being adapted to reduce turbulent flow of fluid within said outlet in use.

31. A valve according to claim 30, wherein the turbulent flow reducing means includes a shroud or cowl shaped extension on the outlet side of the valve body.

32. A valve according to claim 23, wherein release of said source of high pressure fluid from said pilot conduit decreases the fluid pressure in said conduit to cause said biasing means to bias said valve closure member toward said valve seat and thereby close said valve.

33. A valve according to claim 32, wherein a bleed conduit extends through said piston from said cylinder to said flow passage to allow fluid under pressure in said cylinder to discharge into said flow passage upon release of said source of high pressure fluid.

34. A valve according to claim 29, wherein the generally C shaped clamp is adapted to clamp to an internal wall of a pressure vessel or a conduit for supplying a reverse pulse of air for reverse pulse cleaning of filter elements.

35. A valve according to claim 23, wherein the outlet is connected to a conduit adapted to direct a pulse of air toward one or more filter elements to be cleaned when said valve is open.

36. A valve according to claim 23, wherein the valve body is adapted to be coupled to a coupling ring or annular flange for coupling the valve to a pressure vessel, the annular flange or coupling ring including means for engaging with the pressure vessel, and the valve body includes formations adapted to engage with co-operant formations on the flange or coupling ring to mount the valve body to the flange to coupling ring.

* * * * *